US008545139B2

(12) United States Patent
Beichter et al.

(10) Patent No.: US 8,545,139 B2
(45) Date of Patent: Oct. 1, 2013

(54) MAGNETIC DRILLING STAND WITH HOLDING FORCE MONITORING

(75) Inventors: Martin Beichter, Stuttgart (DE); Rudolf Stoppel, Schwaebisch Gmuend (DE)

(73) Assignee: C & E Fein GmbH (DE)

( * ) Notice: Subject to any disclaimer, the term of this patent is extended or adjusted under 35 U.S.C. 154(b) by 820 days.

(21) Appl. No.: 12/773,585

(22) Filed: May 4, 2010

(65) Prior Publication Data

US 2010/0290847 A1 Nov. 18, 2010

(30) Foreign Application Priority Data

May 13, 2009 (DE) ......................... 10 2009 022 333

(51) Int. Cl.
*B23B 39/04* (2006.01)
*B23B 47/00* (2006.01)

(52) U.S. Cl.
USPC ................... 408/8; 408/76; 408/10; 408/710; 318/39; 318/453

(58) Field of Classification Search
USPC ................. 408/76, 5, 6, 8, 9, 10, 11, 16, 710; 318/39, 453; 361/23, 115
See application file for complete search history.

(56) References Cited

U.S. PATENT DOCUMENTS

| | | | | | |
|---|---|---|---|---|---|
| 3,371,257 | A | * | 2/1968 | Warren et al. | 318/39 |
| 3,969,036 | A | * | 7/1976 | Hougen | 408/76 |
| 4,261,673 | A | * | 4/1981 | Hougen | 408/5 |
| 4,278,371 | A | * | 7/1981 | Meyer | 408/76 |
| 4,591,301 | A | * | 5/1986 | Pelfrey | 408/76 |
| 4,639,170 | A | * | 1/1987 | Palm | 408/76 |
| RE33,145 | E | * | 1/1990 | Palm | 408/76 |
| 5,007,776 | A | | 4/1991 | Shoji | |
| 5,035,547 | A | | 7/1991 | Shoji | |
| 5,096,339 | A | | 3/1992 | Shoji | |
| 5,984,020 | A | | 11/1999 | Meyer et al. | |
| 6,072,675 | A | | 6/2000 | Murakami et al. | |
| 2012/0189392 | A1 | * | 7/2012 | Golabiewski et al. | 408/76 |
| 2013/0055551 | A1 | * | 3/2013 | Natti et al. | 29/559 |

FOREIGN PATENT DOCUMENTS

| | | | | |
|---|---|---|---|---|
| DE | 1811583 | B1 | | 7/1970 |
| DE | 3306063 | A1 | * | 9/1983 |
| DE | 3100933 | C2 | | 11/1985 |
| DE | 4019515 | A1 | | 1/1991 |

(Continued)

OTHER PUBLICATIONS

European Search Report; Application No. EP 10 15 7835; Aug. 12, 2010; 4 pages.

*Primary Examiner* — Essama Omgba
(74) *Attorney, Agent, or Firm* — St. Onge Steward Johnston & Reens LLC

(57) ABSTRACT

A magnetic drilling stand is disclosed having a drilling unit (20), having an electromagnet (14) for fixing the magnetic drilling stand (10) on a component (12), having a voltage source which can be coupled to the electromagnet (14), and having a controller (28) for monitoring the holding force of the electromagnet (14), with the controller (28) having a device for monitoring the current level of the electromagnet (14), in order to identify a fault state or an adequate magnetic holding force, with a signal for an adequate magnetic holding force being produced only if, within a test phase, the current level of the electromagnet is below a respectively predetermined threshold value at at least two predetermined times after the start of the test phase.

20 Claims, 3 Drawing Sheets

(56) References Cited

FOREIGN PATENT DOCUMENTS

| | | | |
|---|---|---|---|
| DE | 4102201 | A1 | 10/1991 |
| DE | 69729226 | T2 | 9/2004 |
| EP | 1103350 | A2 | 5/2001 |
| GB | 2241618 | A | 9/1991 |
| JP | 57184614 | A | 11/1982 |
| JP | 57102709 | A | 6/1985 |

* cited by examiner

MAGNETIC DRILLING STAND WITH HOLDING FORCE MONITORING

BACKGROUND OF THE INVENTION

The invention relates to a magnetic drilling stand having a drilling unit, in particular for core hole drilling, having an electromagnet for fixing the magnetic drilling stand on a component, having a voltage source which can be coupled to the electromagnet, and having a controller for monitoring the holding force of the electromagnet, with the controller having a device for monitoring the current level of the electromagnet in order to derive from this a signal for an adequate magnetic holding force or for a fault state.

The invention furthermore relates to a method for monitoring the holding force of an electromagnet in a magnetic drilling stand such as this.

A magnetic drilling stand and a method such as this are known from JP 571 027 09 A (Patent Abstracts of Japan). In this case, the holding force of an electromagnet in a magnetic drilling stand is monitored by a magnet sensor device which contains a hole element, a constant current source, resistors and a comparator circuit. The comparator circuit has resistors and a computation unit, in order to monitor the magnetic holding force. When the electromagnet is switched on, the magnetic drilling stand is magnetically held on a component. If the magnetic holding force is not adequate, then a warning signal is output via the comparator circuit, as a result of which the drilling unit cannot be operated.

Although a monitoring circuit such as this allows the magnetic holding force in a magnetic drilling stand to be monitored reliably to a certain extent, the activation of the drilling unit is, however, dependent only on one specific threshold value being reached. This may not ensure adequate reliability in some cases, in different operating states.

Furthermore, U.S. Pat. No. 5,035,547 discloses a magnetic drilling machine in which a switch is provided which monitors any movement of the drilling stand on a component. This switch may be a mercury switch, a vibration switch or the like.

Although this also results in a certain level of safety for the situation in which the magnetic holding force of the magnetic drilling stand is inadequate, disconnection takes place only when a certain movement has actually already occurred. This is not considered to be adequate for all hazard states.

According to DE-AS-1 811 583, the circuit for drilling operation is interrupted in a magnetic drilling stand when no current is flowing in the DC circuit of the electromagnet. Switching on is possible only when current is flowing through the electromagnet.

A controller such as this is not considered to be adequate to ensure an adequate electromagnet holding force in all operation states, since all that is monitored is whether the electromagnet is or is not actually switched on.

According to DE 31 00 933 C2, in the case of a magnetic drilling stand, a switch which responds to the magnetic flux of the electromagnet switches the current for drilling operation off if the magnetic flux density falls below a specific level. A reed switch is used as a switch for this purpose. This is fitted in the vicinity of the electromagnet such that it is influenced when the magnet is energized.

Although, in principle, such monitoring of the magnetic flux results in increased safety, reed switches are, however, relatively expensive and susceptible to defects.

SUMMARY OF THE INVENTION

In view of this it is a first object of the invention to disclose a magnetic drilling stand which ensures simple and reliable monitoring of the magnetic holding force of the electromagnet.

It is a second object of the invention to disclose a simple and reliable method for monitoring the holding force of an electromagnet in a magnetic drilling stand.

It is a third object of the invention to disclose a magnetic drilling stand which offers a higher safety standard against operating failures than prior stands.

According to the invention, these and other objects are achieved with of a magnetic drilling stand of the type mentioned initially, wherein the controller produces a signal for an adequate magnetic holding force when, within a test phase, the current level of the electromagnet is below a respectively predetermined threshold value at at least two predetermined times after the start of the test phase.

The invention is also achieved by a method for monitoring the holding force of an electromagnet in a magnetic drilling stand, in which the current level of the electromagnet is monitored in order to derive therefrom a signal for a sufficient magnetic holding force or for a fault state, with a signal for a sufficient magnetic holding force being produced if, within a test phase, the current level of the electromagnet is below a respectively predetermined threshold value at at least two predetermined times after the start of the test phase.

The object of the invention is achieved completely in this way.

According to the invention, it has been found that use can be made of the fact that, when the DC voltage for the electromagnet is switched on, the magnetic holding force rises only gradually within a specific time period up to the maximum holding force. It has also been found that this fact can be monitored via the current flow of the electromagnet, and that specific times can be selected at which only a certain magnetic current level need be present in order to make it possible to decide whether the magnetic flux density is adequate. The current level through the electromagnet after the DC voltage is switched on depends in particular on the size of the air gap between the electromagnet and the component, on the surface condition of the component, and on the magnetic characteristics of the (ferromagnetic) component. If the air gap is sufficiently small and the component has a sufficiently smooth surface condition, then the current level of the electromagnet rises relatively slowly, after the DC voltage has been switched on, up to the rated current of the electromagnet. If, in contrast, the air gap is for example too great, then although the current level has a rising profile over time, the rise in the time profile is much too fast, and the rated current of the electromagnet is reached too quickly. According to the invention, use is made of this phenomenon by monitoring the current level at various times after the electromagnet has been switched on in order to monitor an adequate magnetic holding force of the electromagnet in a relatively simple and very reliable manner.

According to one development of the invention, the controller has a signalling means for signaling a fault state for a user. This may be a visual and/or audible and/or tactile signal (for example vibration).

Additionally or alternatively according to a further feature of the invention, activation of the drilling unit may be permitted only when no fault state is identified.

This results in a high degree of safety against control errors.

In one advantageous development of the invention, the electromagnet is at least partially demagnetized in a demagnetization phase which precedes the test phase, before a DC voltage is applied in the test phase.

This measure has the advantage that the demagnetization before the start of the test phase reduces the effects of magnetic hysteresis as a result of which the same conditions are always present, irrespective of the previous residual magnetization of the electromagnet from a previous work process, in order to allow the magnetic holding force to be monitored precisely in the test phase.

For this purpose, a DC voltage of alternating polarity or an AC voltage can be applied to the electromagnet in the demagnetization phase.

According to a further embodiment of the invention, the controller produces a signal for an adequate magnetic holding force when the current through the electromagnet has reached at most 85% of the rated current of the electromagnet after 30% of a predetermined duration of the test phase has elapsed, and has reached at most 95% of the rated current of the electromagnet after 43% of the duration of the test phase has elapsed.

From experience, these threshold values ensure that the electromagnet provides an adequate holding force.

If the current level is initially above a predetermined threshold value at at least one of the predetermined times within the test phase, then, according to one development of the invention, the controller produces a signal for an adequate magnetic holding force if the current level of the electromagnet is below predetermined threshold values at each of at least two later times within the test phase.

This means that, if it is first of all found at the start of the test phase that the current level is too high, then a safe decision as to whether the magnetic holding force is adequate can nevertheless be made by a subsequent check of the current level at two later times within the test phase.

For this purpose, the controller preferably produces a signal for an adequate magnetic holding force if the current level of the electromagnet is below predetermined threshold values at each of at least two successive, later times within the test phase.

Greater safety, in order to ensure that the magnetic holding force is adequate, is achieved by checking the maximum current level of the electromagnet at each of two successive, later times.

According to a further refinement of the invention, the controller produces a signal for a fault state if the current level falls below a predetermined threshold value in a working phase after the test phase has elapsed.

This ensures that the magnetic holding force is monitored continuously even after the test phase has elapsed, while the drilling unit is being used for working.

In this case, the controller can for example identify a fault state and if appropriate switch off the drilling unit if the current level falls below a predetermined threshold value, which corresponds to 50% of the rated current of the electromagnet, in the working phase after the test phase has elapsed.

In this case, by way of example, the electromagnet design may be based on 50% of the rated current or a different value, for example 70% of the rated current.

The test phase must be designed to be sufficiently long to ensure a safe monitoring of the current level of the electromagnet within the test phase. It has been found that a duration of 700 to 800 milliseconds, preferably of about 720 to 750 milliseconds, is generally sufficient for this purpose.

The demagnetization phase which preferably precedes the test phase may, for example, have a duration of 700 to 1000 milliseconds, preferably of 800 to 900 milliseconds.

As already mentioned above, in the case of the method according to the invention, a DC voltage of alternating polarity or an AC voltage is preferably applied to the electromagnet in a demagnetization phase which precedes the test phase.

Furthermore, in the case of the method according to the invention, which is preferably if the current level is initially above a predetermined threshold value at at least one of the predetermined times within the test phase, a signal for an adequate magnetic holding force is then produced if the current level of the electromagnet is below predetermined threshold values at each of at least two later times within the test phase, with the two later times preferably being successive, later times.

It is self-evident that the features mentioned above and those which are still to be explained in the following text can be used not only in the respectively stated combination but also in other combinations or on their own, without departing from the scope of the invention.

BRIEF DESCRIPTION OF THE DRAWINGS

Further features and advantages of the invention will become evident from the following description of one preferred exemplary embodiment, with reference to the drawings, in which:

FIG. 2 shows a voltage/time diagram, which shows the voltage rise when a DC voltage source for the electromagnet is switched on;

DETAILED DESCRIPTION OF THE PREFERRED EMBODIMENTS

Figure 1:
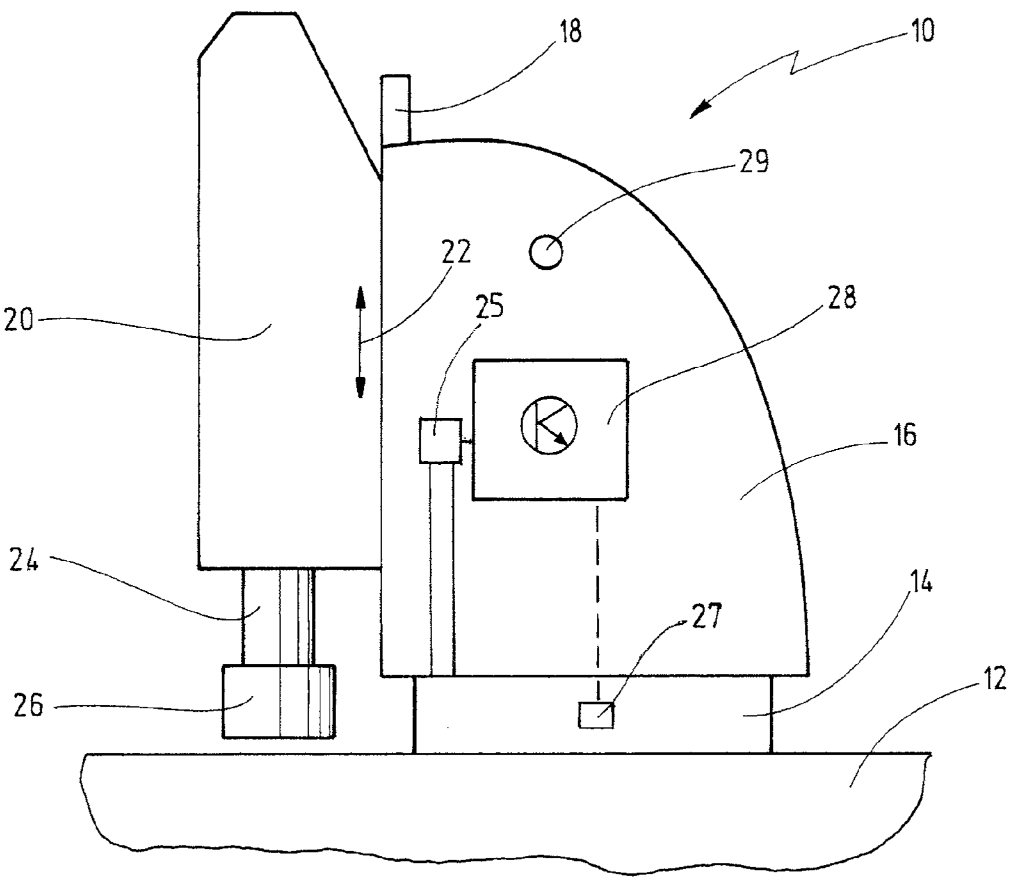
FIG. 1 shows a simplified view of a magnetic drilling stand according to the invention, in the form of a core hole drilling machine.

FIG. 1 shows a simplified illustration of a magnetic drilling stand according to the invention, which is annotated with the number 10, overall. In the present case, this is a core hole drilling machine.

The magnetic drilling stand 10 has a base 16 at whose lower end an electromagnet 14 is provided. A guide 18 is provided at the front end of the base 16, which end is arranged vertically in the present case, along which guide 18 a drilling unit 20 can be moved, as is indicated by the double-headed arrow 22. A drilling spindle 24, on which a tool 26 is clamped, is provided on the drilling unit 20. The tool 26 may be a core hole drill, for example.

The magnetic drilling stand 10 is held by the magnetic field of the electromagnet 14 on a component 12 when the electromagnet 14 is powered with a DC voltage supplied by voltage source 25. The component 12 must necessarily be a ferromagnetic component, for example composed of steel, in order to ensure an adequate magnetic force.

It is self-evident that the illustration shown here with a horizontal component surface represents only an example and that the component can be arranged in all possible directions, and, for example, it may be a steel support which is arranged vertically or else a steel support which is arranged horizontally and underneath which the magnetic drilling stand is mounted from underneath, with the aid of the electromagnet 14. The drilling tool 26 is typically used to generate core hole bores in the component 12 itself.

It is self-evident that an adequate magnetic holding force is absolutely essential in order to prevent accidents resulting from the magnetic drilling stand 10 sliding off or becoming detached from the component 12 while working.

According to the invention, the magnetic holding force is monitored by monitoring the current level of the electromagnet when a DC voltage is applied at different times. To this end a current sensor 27 is coupled to the electromagnet 14 to generate a current signal I indicative for the current flowing through and for outputting a current signal to the controller 28 being indicative of the current level I through the electromagnet 14.

The fundamental principle of ensuring that an adequate magnetic holding force is maintained by monitoring the current level at different times when a DC voltage is applied will be explained in more detail in the following text with reference to FIGS. 2 and 3.

Figure 2:
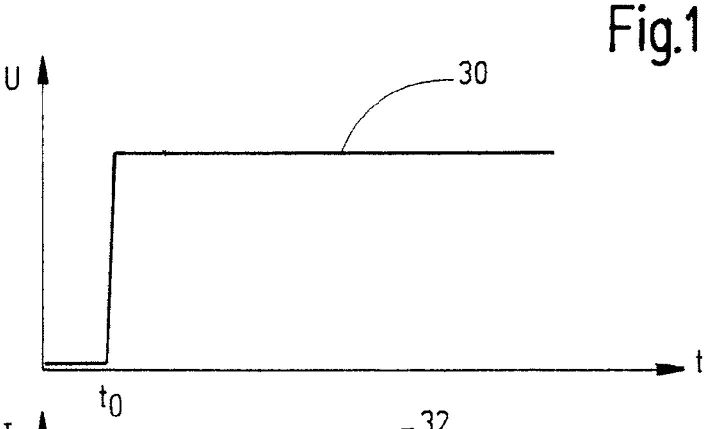

FIG. 2 schematically illustrates the voltage/time profile, which is annotated with the number 30, when a DC voltage is supplied to the electromagnet 14 by voltage source 25. When the DC voltage is switched on, the voltage U rises virtually as a step function up to the rated voltage. This results in the curve 30 having an approximately square profile.

If the associated current level I of the electromagnet is recorded from the start at the time $t_0$ when the DC voltage is switched on, then the magnetic hysteresis results in the magnetization, and therefore also the current level of the electromagnet, rising only gradually. The magnetization of the component and therefore the current level of the electromagnet as well may develop differently over time depending on various parameters, in particular including the air gap between the electromagnet 14 and the component surface, as well as the surface condition of the component surface and the magnetic characteristics of the component.

Figure 3:
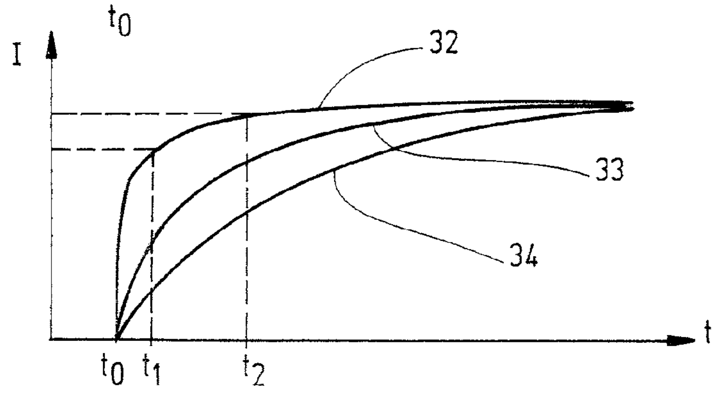
FIG. 3 shows a current/time diagram, which shows various current profiles of the electromagnet which are associated with the voltage profile shown in FIG. 2.

The curve 34 in FIG. 3 shows a typical profile of the current level of the electromagnet 14, which results when the electromagnet ensures high magnetization of the component within a short time. In comparison to this, the curves 33 and 32 show current profiles for which the magnetization of the component is not adequate to ensure an adequate magnetic holding force. This is evident from the curve having a considerably steeper profile.

According to the invention, this phenomenon is now used in order to make a decision, by monitoring of the current level of the electromagnet of predetermined times, as to whether the magnetic holding force of the magnetic drilling stand is adequate to ensure safe working.

Figure 4:
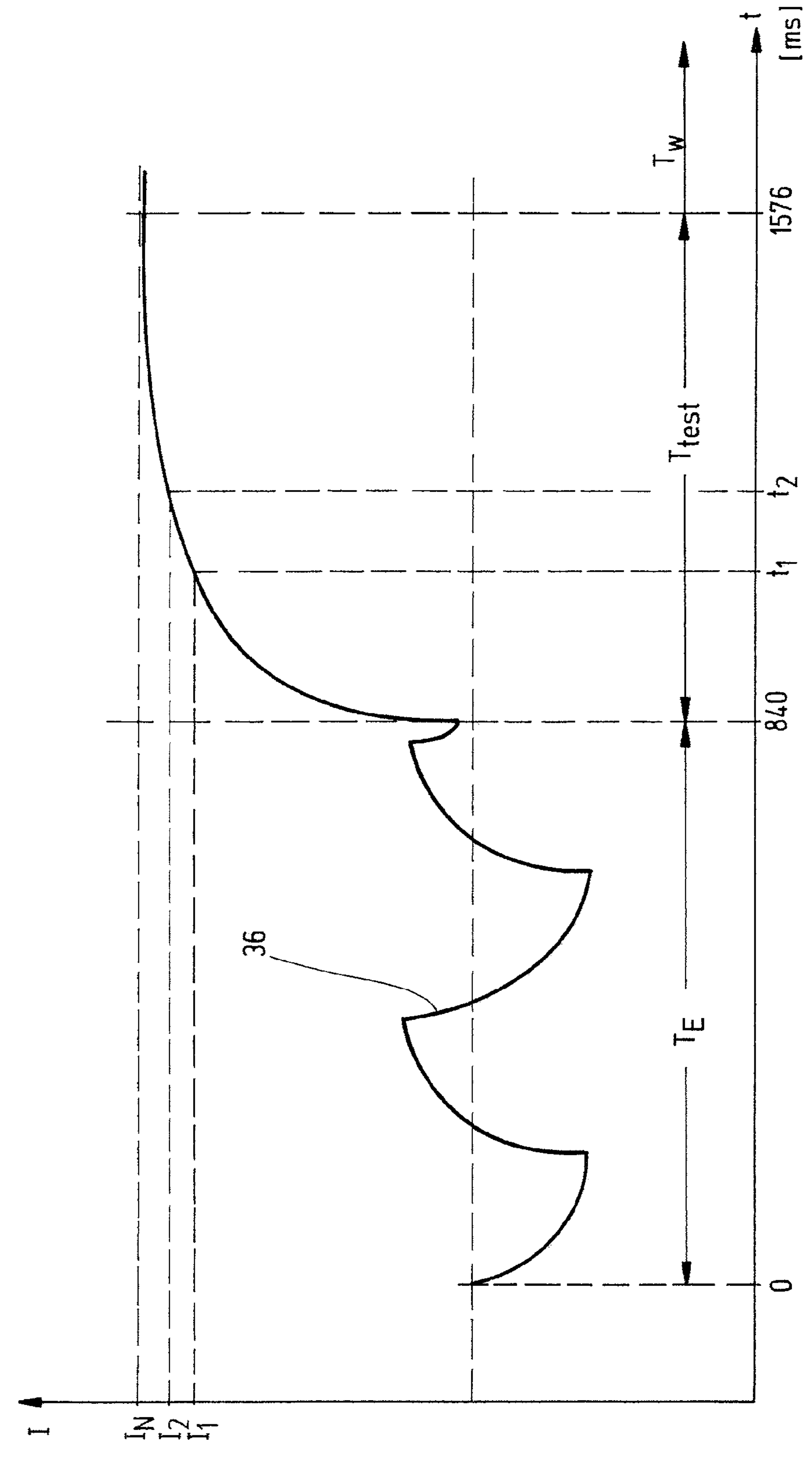
FIG. 4 shows a current/time diagram, which shows the current profile of the electromagnet as a function of time, with a demagnetization phase of duration $T_E$ first of all being carried out with a DC voltage of alternating polarity, followed by a test phase of duration $T_{test}$, within which a DC voltage is applied to the electromagnet, with the test phase finally being followed by a working phase of duration $T_W$.

FIG. 4 shows one possible implementation.

A demagnetization process with a duration $T_E$ is preferably carried out before the monitoring of the current rise within a predetermined test phase of duration $T_{test}$. The previous demagnetization phase ensures that the test phase is always carried out with the same initial conditions, irrespective of the previous magnetization of the magnetic drilling stand. For this purpose, a DC voltage of alternating polarity is applied to the electromagnet 14 in the demagnetization phase, as a result of which the magnetization at the end of the demagnetization phase $T_E$ is virtually zero. When the DC voltage is subsequently switched on, there is therefore virtually no remanence magnetization remaining, thus resulting approximately in a new curve. Any previously existing remanence is thus largely removed by the demagnetization, as a result of which objective conditions exist in every case when checking the current level of the electromagnet.

In the present case, for example, the demagnetization phase $T_E$ may have a duration of 840 milliseconds, with the test phase $T_{test}$ which immediately follows it having a duration of 736 milliseconds. If the test phase is completed positively, then this is followed by a working phase $T_W$, within which processing is carried out by the drilling unit 20, for example in order to produce a hole in the component 12.

Once the demagnetization phase $T_E$ has elapsed, the current level of the electromagnet is checked, for example, at the time $t_1$ after 30% of the duration of the test phase $T_{test}$, that is to say after approximately 1061 milliseconds, and after 43% of the duration of the test phase $T_{test}$, that is to say after approximately 1156 milliseconds. If the current level I at the time $t_1$ is approximately 87% of the rated current level of the electromagnet $I_N$, and if the current level at the time $t_2$ is approximately 97% of the rated current level of the electromagnet ($I_1=0.87\ I_N$, $I_2=0.97\ I_N$) then this means that the magnetization is sufficient to ensure an adequate magnetic holding force.

According to FIG. 1, the magnetic drilling stand furthermore also has a signal transmitter 29, which is coupled to the controller 28 and visually and/or audibly indicates a false state when a false state, that is to say an inadequate magnetic holding force is found.

Figure 5:
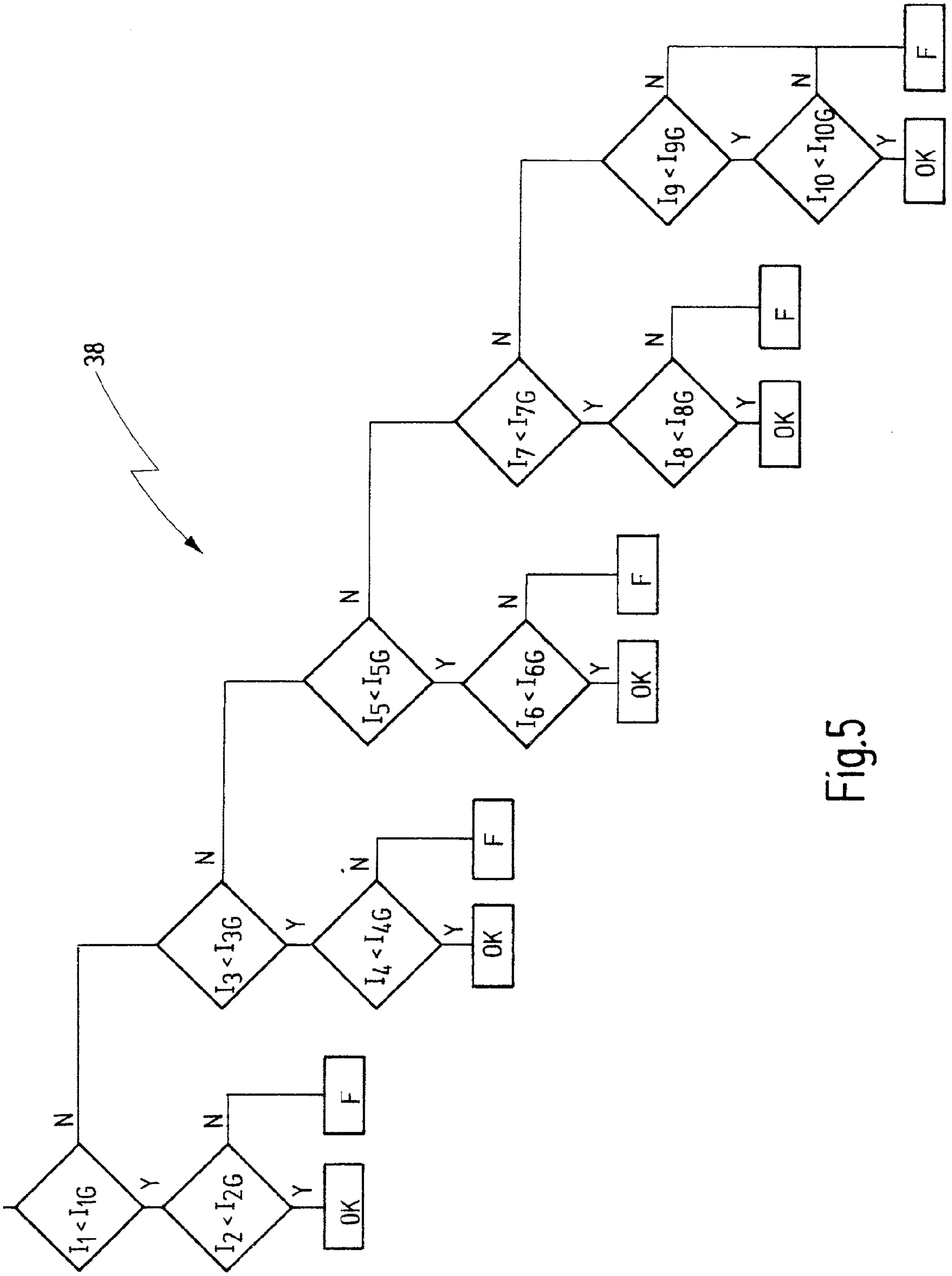
FIG. 5 shows a flowchart, which shows possible monitoring of the current level of the electromagnet at various times within the test phase after the start of the application of a DC voltage.

FIG. 5 shows one possible flowchart which can be used to carry out refined monitoring of the current level.

According to the flowchart 38, a check is first of all carried out to determine whether the current level of the electromagnet at a time $t_1$ is below a predetermined current level for this time ($I_1<I_{1G}$). If this is the case, a check is then carried out to determine whether the current level is less than a predetermined limit ($I_2<I_{2G}$) at a subsequent time $t_2$. If this is the case, then the holding force of the electromagnet is adequate, leading to the “OK” being output, thus allowing the drilling unit to be activated. If the second check shows that the current level exceeds the predetermined threshold value $I_{2G}$, then this leads to a fault being deduced, leading to a fault signal being output, as indicated by “F”.

However, if the current level exceeds the threshold value $I_{1G}$ in the first check at the first time, then a further check is carried out over two successive times $t_3$ and $t_4$. If the current level $I_3$ is less than $I_{3G}$ and the current level $I_4$ is subsequently less than $I_{4G}$, then the magnetic holding force is sufficient, and this is indicated by “OK”. If, in contrast, the current level $I_4$ at the time $t_4$ is greater than the predetermined current level $I_{4G}$ for this time, then this indicates a fault, which is indicated by “F”.

If, in contrast, the current level is already excessive at the time $t_3$, then a check is once again carried out at two successive later times $t_5$, $t_6$.

This cascade is appropriately continued until the last possible checks at the times $t_9$ and $t_{10}$.

If the current level is below the predetermined threshold value ($I_9<I_{9G}$, $I_{10}<I_{10G}$) at the two times $t_9$, $t_{10}$, then the magnetic holding force is adequate, otherwise a fault has occurred.

It is self-evident that the checking capability can be refined by further cascades.

It is also self-evident that, instead of monitoring the current level at predetermined times, it is also possible to monitor the current level rise and that appropriate monitoring can be ensured as a function of a specific current level rise at a predetermined time or the current level rise at specific successive times to ensure that activation of the drilling unit can be allowed.

If a full signal is produced, this is indicated visually and audibly to the user, preferably by means of the signal indication. Additionally or alternatively, activation of the drilling unit 20 may be blocked.

What is claimed is:

1. A magnetic drilling stand comprising:

a base;

a drilling unit received on said base;

an electromagnet received on said base for fixing said magnetic drilling stand on a component, said electromagnet having a rated current $I_N$;

an controller for controlling operation of said electromagnet and of said drilling unit;

a voltage source controlled by said controller and coupled to said electromagnet;

a sensor for monitoring a current through said electromagnet and for generating a current signal I indicative of a current flowing through said electromagnet and for outputting said current signal to said controller;

wherein said controller first powers said electromagnet for a certain test phase of a duration T, before operating said drilling unit and generates either an OK signal indicative for a sufficient magnetic holding force or a fault F signal indicative for insufficient magnetic holding force, depending on the current level signals at different times within said test phase;

wherein said controller generates said OK signal when, after 30% of the duration T of said test phase has elapsed, a current level of said electromagnet of at most 85% of said rated current $I_N$ is reached, and after 43% of the duration T of said test phase has elapsed said current level reaches at most 95% of said rated current $I_N$.

2. The magnetic drilling stand of claim 1, wherein said test phase has a duration of 700 to 800 milliseconds.

3. The magnetic drilling stand of claim 1, wherein prior to said test phase said electromagnet is at least partially demagnetized in a demagnetization phase, before a DC voltage is applied to said electromagnet within said test phase.

4. The magnetic drilling stand of claim 1, wherein said controller produces a fault signal indicative of a fault state, if the current level falls below a predetermined threshold value $I_{min}$ in a working phase following said test phase.

5. The magnetic drilling stand of claim 4, wherein said controller produces said fault signal, if the current level in said working phase falls below 50% of said rated current $I_N$ of said electromagnet.

6. A magnetic drilling stand comprising:

a base;

a drilling unit received on said base;

an electromagnet received on said base for fixing said magnetic drilling stand on a component;

an controller for controlling operation of said electromagnet and of said drilling unit;

a voltage source controlled by said controller and coupled to said electromagnet;

a sensor for monitoring a current through said electromagnet and for generating a current signal I indicative of a current flowing through said electromagnet and for outputting said current signal to said controller;

wherein said controller first powers said electromagnet for a certain test phase, before operating said drilling unit and generates either an OK signal indicative for a sufficient magnetic holding force or a fault F signal indicative for insufficient magnetic holding force, depending on the current level signals at different times within said test phase;

wherein said controller generates said OK signal when, within said test phase, a current level of said electromagnet is below predetermined threshold values $I_1 < I_{1G}$ and $I_2 < I_{2G}$ at at least two predetermined times $t_1$ and $t_2$ after starting said test phase.

7. The magnetic drilling stand of claim 6, further comprising a signalling means for signaling a fault state to a user, if said controller generates said F signal.

8. The magnetic drilling stand of claim 6, wherein said controller allows activation of said drilling unit only when an OK signal is generated.

9. The magnetic drilling stand of claim 6, wherein prior to said test phase said electromagnet is at least partially demagnetized in a demagnetization phase, before a DC voltage is applied to said electromagnet within said test phase.

10. The magnetic drilling stand of claim 9, wherein within said demagnetization phase a DC voltage of alternating polarity or an AC voltage is applied to said electromagnet for demagnetizing said electromagnet.

11. The magnetic drilling stand of claim 6, wherein, if the current level is above a predetermined threshold value at at least one of the predetermined times within said test phase, said controller produces an OK signal indicative of a sufficient magnetic holding force if the current level of the electromagnet is below predetermined threshold values $I_n < I_{nG}$ and $I_{n+1} < I_{n+1G}$ at each of at least two later times within said test phase.

12. The magnetic drilling stand of claim 11, wherein said controller generates an OK signal indicative of a sufficient magnetic holding force, if the current level of the electromagnet is below predetermined threshold values $I_n < I_{nG}$ and $I_{n+1} < I_{n+1G}$ at each of at least two successive, later times within the test phase.

13. The magnetic drilling stand of claim 6, wherein said controller produces a fault signal indicative of a fault state, if the current level falls below a predetermined threshold value $I_{min}$ in a working phase following said test phase.

14. The magnetic drilling stand of claim 13, wherein said electromagnet has a certain rated current $I_N$, and wherein said controller produces said fault signal, if the current level in said working phase falls below said predetermined threshold value $I_{min}$ which corresponds to 50% of said rated current $I_N$ of said electromagnet.

15. The magnetic drilling stand of claim 6, wherein said test phase has a duration of 700 to 800 milliseconds.

16. The magnetic drilling stand of claim 6, wherein said test phase has a duration of 720 to 750 milliseconds.

17. The magnetic drilling stand of claim 6, wherein said test phase is preceded by a demagnetization phase with a duration of 700 to 1000 milliseconds.

18. The magnetic drilling stand of claim 6, wherein said test phase is preceded by a demagnetization phase with a duration of 800 to 900 milliseconds.

19. A magnetic drilling stand comprising:

a base;

a drilling unit received on said base;

an electromagnet received on said base for fixing said magnetic drilling stand on a component;

an controller for controlling operation of said electromagnet and of said drilling unit;

a voltage source controlled by said controller and coupled to said electromagnet;

a sensor for monitoring a current through said electromagnet and for generating a current signal I indicative of a current flowing through said electromagnet and for outputting said current signal to said controller;

wherein said controller first at least partially demagnetizes said electromagnet in a demagnetization phase;

wherein said controller thereafter powers said electromagnet with a DC voltage for a certain test phase, before operating said drilling unit and generates either an OK signal indicative for a sufficient magnetic holding force or a fault F signal indicative for insufficient magnetic holding force, depending on the current level signals at different times within said test phase;

wherein said controller generates said OK signal when, within said test phase, if a current level of said electromagnet is below predetermined threshold values $I_1<I_{1G}$ and $I_2<I_{2G}$ at at least two predetermined times $t_1$ and $t_2$ after starting said test phase;

wherein, if the current level is above said predetermined threshold value at at least one of the predetermined times within said test phase, said controller produces an OK signal indicative of a sufficient magnetic holding force, if the current level of the electromagnet is below predetermined threshold values $I_n<I_{nG}$ and $I_{n+1}<I_{n+1G}$ at each of at least two later times within said test phase; and wherein said controller allows activation of said drilling unit only when an OK signal is generated.

20. The magnetic drilling stand of claim 19, wherein said controller produces a fault signal indicative of a fault state, if the current level falls below a predetermined threshold value $I_{min}$ in a working phase following said test phase.

* * * * *